United States Patent [19]

Poeppel

[11] Patent Number: 5,696,432
[45] Date of Patent: Dec. 9, 1997

[54] METHOD OF CONTROLLING THE POWER OF AN INDUCTION MOTOR

[75] Inventor: Josef Poeppel, Fahlenbach, Germany

[73] Assignee: Temic Telefunken microelectronic GmbH, Heilbronn, Germany

[21] Appl. No.: 542,971

[22] Filed: Oct. 13, 1995

[30] Foreign Application Priority Data

Oct. 14, 1994 [DE] Germany .................. 44 36 740.6

[51] Int. Cl.$^6$ ...................................................... H02P 7/622
[52] U.S. Cl. ............................ 318/732; 318/772; 318/810
[58] Field of Search ................................... 318/729, 767, 318/772, 778, 779, 781, 798, 799, 800, 807, 810, 811, 812, 816, 817, 830, 731, 732, 737

[56] References Cited

U.S. PATENT DOCUMENTS

| 4,300,077 | 11/1981 | Katz et al. ....................... 318/812 |
| 4,737,701 | 4/1988 | Hoemann et al. . |
| 4,739,240 | 4/1988 | MacMinn ......................... 318/696 |
| 4,806,838 | 2/1989 | Weber ............................... 318/729 |
| 4,843,295 | 6/1989 | Thompson et al. ................ 318/786 |

FOREIGN PATENT DOCUMENTS

| 36 07 162 | 2/1988 | Germany . |
| 40 31 708 | 4/1992 | Germany . |
| 62-178195 | 1/1988 | Japan . |
| 3-3693 | 3/1991 | Japan . |
| 1552625 | 8/1979 | United Kingdom . |
| 2093288 | 8/1982 | United Kingdom . |
| 2215147 | 9/1989 | United Kingdom . |
| 2242795 | 10/1991 | United Kingdom . |
| 2253099 | 8/1992 | United Kingdom . |
| 2271893 | 4/1994 | United Kingdom . |

*Primary Examiner*—Bentsu Ro
*Attorney, Agent, or Firm*—Spencer & Frank

[57] ABSTRACT

To control the output from an induction motor with a main winding and an auxiliary winding with multiple taps, varying output stages of the motor are adjusted by the activation of the auxiliary winding or one of its part-windings. According to the invention, the coarse adjustment of the power to be output by the motor is effected by the selection of a certain output stage and a repeating digital m-bit keying pattern generated simultaneously for the purpose of fine adjustment, so that the motor is driven alternately at the set output stage and the next higher or next lower output stage as a function of the sequential logic values of the keying pattern. By means of the process complying with the invention, precise power control is possible which can be used to advantage for the adjustment of output. In addition, a device is described to carry out the process complying with the invention, according to which a microprocessor undertakes the coarse adjustment by way of a control circuit while simultaneously generating the m-bit keying pattern, which is stored in a ring counter, which itself directs the logic values of the keying pattern to the control circuit in succession.

5 Claims, 3 Drawing Sheets

METHOD OF CONTROLLING THE POWER OF AN INDUCTION MOTOR

BACKGROUND OF THE INVENTION

The invention concerns a method of controlling the power of a single-phase, mains-electricity powered induction motor, in particular a capacitor motor complete with a main winding and an auxiliary winding as well as a device for implementing the method according to this invention.

German Patent No. DE 36 07 162 C2 describes a capacitor motor, powered on a single phase electricity mains, on which motor a first switch will connect the main winding in series to the auxiliary winding, as well as in parallel to the capacitor, and on which motor a second switch will connect the main winding in parallel to the series circuit comprising auxiliary winding and capacitor. If this motor is switched on by closing the first switch, the motor will operate at a low power output level. If, however, the first switch is opened, and the second switch is then closed, the motor will run at its top speed, i.e. it will provide maximum power. Then, by means of alternating switch-overs of these two switches, the motor can be set to operate at a power output level somewhere in between the two above-mentioned output stages. Finally, the power output by the motor can be further reduced, if with the first switch closed—that is, if the main winding is connected in series to the auxiliary winding,—the entire motor is connected alternatingly to mains. The switches will be controlled such by a switch control system that switching events will take place on zero-axis crossing of integer periods of the alternating current. However, control signal generation for these switches by means of the switch control system will not be described in this paper.

A capacitor motor of this type is known from U.S. Pat. No. 4,737,701, whereof the auxiliary winding is provided with taps to form multiple part-windings, the said taps being capable of being selectively connected in series to the main winding by way of a selector switch, with the result that the part-windings are no longer available as an auxiliary winding. Depending on the position of the selector switch, various operating points can be set which cause the motor to operate at different speeds and, in turn, to produce varying amounts of torque.

In addition, a process is known from DE 40 31 708 A1 for the differential pressure regulation of a pumping system, in which a capacitor motor of the type known from the above-mentioned publication is used. To achieve a constant differential pressure in the pumping system, the taps on the auxiliary winding are connected to the main winding of the motor as a function of an actual value.

The output control system for the capacitor motor underlying this adjustment process, however, leads to irregular control, the characteristics of which depend on the number of taps on the auxiliary winding. For the controlled variable to be adjusted more precisely to a preset value, a high number of taps would therefore be required; this, however, would have an adverse effect on the costs of the capacitor motor.

SUMMARY OF THE INVENTION

The object of the invention is to provide a process to control the output of a single-phase mains-electricity powered induction motor of the type described above, by which it is possible to accomplish the vitally constant regulation of a regulation quantity or a virtually constant control quantity and which, in addition, can be produced at an economical cost. In addition, a device capable of carrying out the process complying with the invention is intended to be made.

This object will be achieved on the one hand by generating a repeating digital (binary) m-bit data word (code word) for setting the power output of the induction motor, and operating the switch in dependence of the sequence of succeeding logical values; the operation of this switch must be synchronized with mains frequency. As the motor will run at its maximum power output level when the switch is closed, and as it is set to its lowest power output level when the switch is open, it is possible to set the motor to any power output level in between in relation to the m-bit data word, that is the range between the lowest and highest output stages can be discretized, with the actual number of discretizations depending on the length of the m-bit data word. If length m is appropriately selected, and the time duration of a discretization stage—i.e. the time duration defined by the number of repeating cycles of an m-bit data word—is selected to be low, an almost constant regulation or control behavior of the motor can be achieved.

On the other hand, this object will also be achieved by activating a first switch in order to set a defined output stage for coarse adjustment of the power to be output from the induction motor, whilst simultaneously a repeating digital m-bit data word is generated for fine adjustment of the power to be output from the induction motor. Depending on the successive logic values of the data word, the first switch selected for the coarse setting of the power output is activated alternately with a second switch, whereby the second switch sets the next higher or next lower output stage relative to the first switch. In this way, the alternating activation of the first and second switches is synchronized with the mains frequency.

Advantageously, the switching process according to this invention will allow several output stage values located in between two output stages to be set by means of the m-bit data word, without there being a need for additional taps on the auxiliary winding. The number of these additional output stages will depend on length m of the m-bit data word. Since an induction motor exhibits high time constants, the process according to the invention gives rise to virtually constant regulating behavior if the selected time duration of a discretization stage—that is, the time duration defined by the number of repeating cycles of an m-bit data word—is correspondingly low, e.g. 80 ms and an 8-bit data word.

Both solutions are based on the common idea to provide a simple and effective conversion of a preset value or a deviation into an adjustment factor for the quantity to be controlled or regulated—here, the power to be output from the motor, with an adjustment factor, i.e. the m-bit data word (code word) being generated in dependence of the preset value or the deviation.

In order to implement the first method according to this invention, a microprocessor and a ring memory will be provided, with the microprocessor generating the m-bit data word in dependence of a preset value or a deviation and supplying this m-bit data word to the ring memory, and the ring memory successively passing the logical values of the m-bit data word to the control circuit for setting the power to be output by the motor, causing the switch to be keyed on or off as appropriate.

In order to implement the second method according to this invention, a microprocessor will be provided, as before, which will on the one hand perform coarse adjustment in dependence of a preset value or a deviation, via the control circuit, of the power to be output by the motor, but which also generates the m-bit data word and feeds it to a ring counter. The m-bit data word is successively read out from the ring counter and is likewise directed to the control circuit for the fine adjustment of the output to be delivered by the capacitor motor. Here, by means of a second switch, the switch performing coarse adjustment will be alternately keyed on/off in line with the m-bit data word. A zero crossing detector is preferably used to provide the clock pulse for the ring counter.

In this way, the process according to the invention can be carded out with a simple device, since a microprocessor is generally available in the output regulating systems of induction motors, so that only a ting counter to store the m-bit data word is additionally required.

The correlation between an m-bit data word and a preset value is stored in a table; this provides easy access. If a control loop is to be set up, each deviation will be assigned an m-bit data word and also stored in a table.

In an advantageous further application of the invention, where the auxiliary winding features tap-offs, the entire auxiliary winding of the motor will be connected in series to its main winding; this is why, as a rule, the motor will operate at its lowest output level. The adjusting range, however, can be considerably extended downwards from this output stage merely by energizing the auxiliary winding. For this purpose, the switch which sets the lowest output stage must be opened, for which a corresponding m-bit data word is generated, resulting in an on/off keying of the said switch. Synchronization of the keying with the current zero crossing can be effected by the sensing of the secondary current, by computation from a table filed in the microprocessor, or on the basis of the temporary activation of the switch.

BRIEF DESCRIPTION OF THE DRAWINGS

The invention is depicted and explained below with reference to a typical embodiment and in conjunction with the accompanying drawings, wherein.

DESCRIPTION OF THE PREFERRED EMBODIMENTS

Figure 1:
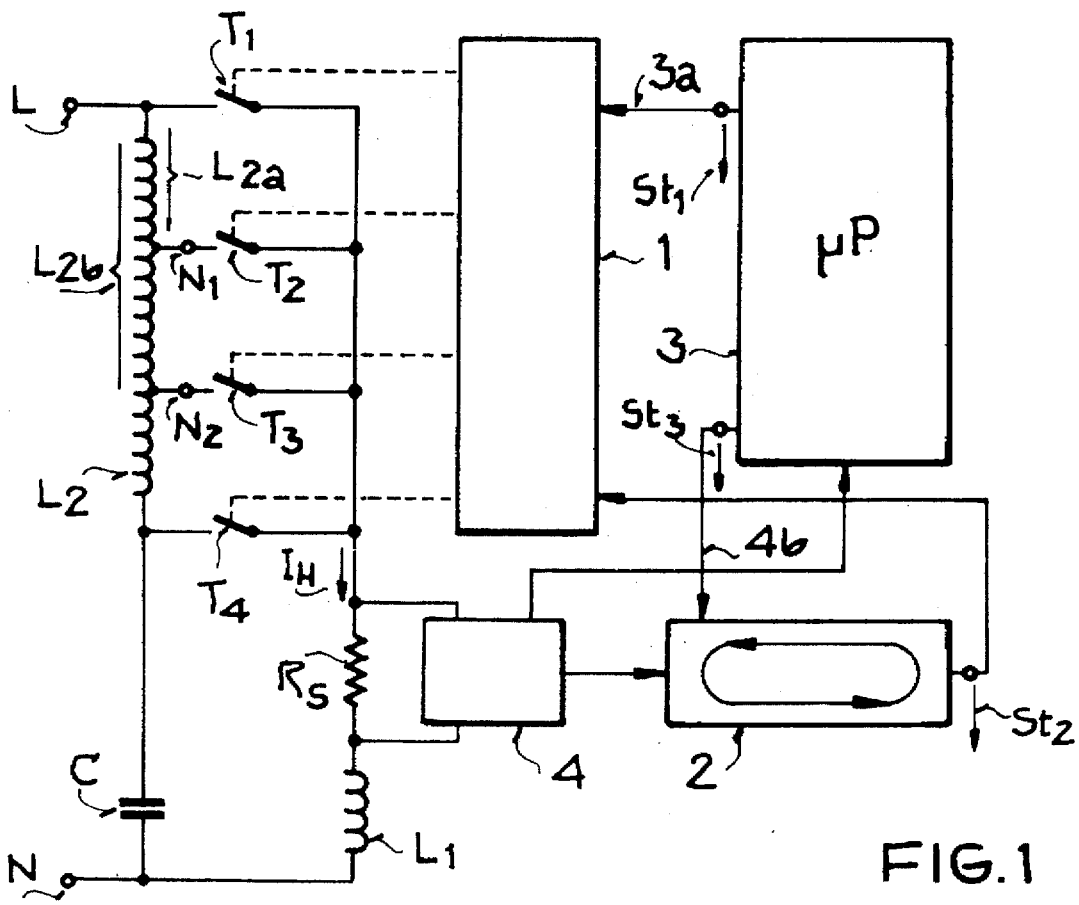
FIG. 1 shows a block circuit diagram of a circuit arrangement to carry out the process according to the invention.

FIG. 1 depicts the main winding, the auxiliary winding and the starting capacitor of a single-phase capacitor motor, identified by the reference symbols L1, L2 and C respectively. In this case, the series circuit including the capacitor C and auxiliary winding L2 lies at the connecting poles N and L of a single-phase mains electricity supply which delivers the operating voltage for the induction motor. A further series circuit including the main winding L1, a shunt resistor Rs and a semiconductor switch T4 is connected in parallel with the starting capacitor C. In addition, the auxiliary winding L2 is provided with a first and second tap N1 and N2, connected respectively via semiconductor switches T2 and T3 to the branch of the circuit which connects the shunt resistor Rs to the semiconductor switch T4. To control the semiconductor switches T1 to T4, which are configured as triacs, the control electrodes of the switches are connected to a control circuit 1 by way of corresponding leads.

The induction motor can be adjusted to differing output stages by means of the triacs T1 to T4, in that the motor runs at varying speeds as a function of the activated triac, so that it also generates varying degrees of torque. Thus the capacitor motor runs at the lowest speed, i.e. is adjusted to a low output stage, when triac T4 is activated and the entire auxiliary winding L2 is connected in series as a choke for the main winding. If, by contrast, one of the two triacs T3 or T2 is activated, a part-winding L2b or L2a on the auxiliary winding L2 is connected in series with the main winding L1, with the result that the speed of the motor is increased in stages, whereby two further output stages can be set. Finally, the highest output stage is reached when triac T1 is activated, in that the auxiliary winding L2 is thus bridged and the main winding L1 is connected directly to phase L. The motor runs at its highest speed and produces its highest torque. By means of this selective energizing of the auxiliary winding or its part-windings, four output stages can be set, using the same operating voltage, which are distinguished from each other by varying degrees of torque.

If, for example, the motor depicted in FIG. 1 is used as a pump motor in a heating installation, the pump delivers its highest output when the main winding L1 of the motor is connected via triac T1 to phase L of the single-phase power supply. The pump output is reduced in stages by the energizing of part-winding L2a or L2b until, when the entire auxiliary winding L2 is energized, the next lowest output level is reached, since a further reduction in the output level is made possible by the fact that none of the four triacs T1 to T4 is connected, so that only a secondary current is maintained through the auxiliary winding L2. With the last-named facility for adjusting the lowest output stage, five adjustable stages thus become available.

In order to permit each of the triacs T1 to T4 to be connected in the zero crossing of the motor operating voltage, a zero point detector 4 is provided which detects the current zero crossings by evaluating the voltage drop at the shunt resistor Rs and directs it to a microprocessor 3.

For the purpose of controlling the triacs T1 to T4, the control circuit 1 receives a first signal St1 generated by the microprocessor 3 and a second control signal St2 which represents an m-bit data word. This m-bit data word is stored in a ring counter 2 and successively read out from the latter into the control circuit 1. The data content of the ring memory 2 is also generated by the microprocessor 3 and read into the ring counter 2.

A certain output stage is set for the coarse adjustment of the power to be output by the motor with the first control signal St1, in that one of the triacs T1 to T4 is activated. The m-bit data word now serves for the fine adjustment of the power to be output by the motor, the said m-bit data word representing a keying pattern for the triac just activated.

If, for example, triac T4 is activated for the coarse adjustment of the power to be output, and if the motor is required to produce a somewhat higher output, the following data word (01111111) is typically generated. This 8-bit data word circulates in the ring counter 2 at the clock pulse rate of the power supply frequency, i.e. at the clock pulse rate of the zero crossings of the main winding current IH, and is read out pulsewise into the control stage 1. In this case, the logic "0" causes the power switch T4 to remain closed, while logic "1", by contrast, causes this power switch T4 to open, for which the power switch T3 is activated. In this way, the entire auxiliary winding L2 is connected in series to the main winding L1 for the duration of one pulse, following which only the part-winding L2b is connected in series to the main winding L1 as a choke, for the duration of seven pulses, wherein at a power supply frequency of 50 Hz, the pulse length is 10 ms.

The effect of the aforesaid digital word can also be established in such a way that switch T4 is closed with logic "0" but opened with logic "1", and that by this means, all the switches T1 to T4 remain open. In contrast to the initial effect of the digital word, a reduction in output is achieved with the last-named process, the reduction lying between the lowest output stage, in which all the switches T1 to T4 are open, and the next higher output stage in which only switch T4 is closed. The amount of reduction or increase in output depends on the distribution of logic "0" and logic "1" within the data word. Thus, with the aid of this data word, which occurs at a certain keying pattern at the switch selected for the coarse adjustment of the power output, the output range lying between two output stages can be discretized. In this case, discretization depends on the length of the data word. A word length of eight bits produces 26 discretization stages in accordance with the following formula:

$$(N-1)*NBit+2,$$

in which N is the number of basic stages (in the present example there are four) and N Bit is the length of the data word. Finally, the OFF-condition and the 100% ON-condition are included as additional stages.

If it is now required to increase motor output further, the microprocessor 3 transfers to switch T3, thus setting the next higher output stage.

Simultaneously, a keying pattern is again generated for switch T3 on the basis of an 8-bit data word likewise generated by the microprocessor 3, so that a keying process is carried out either with switch T2 which is responsible for the next higher output stage or with switch T4 which is responsible for the next lower output stage.

Figure 2:
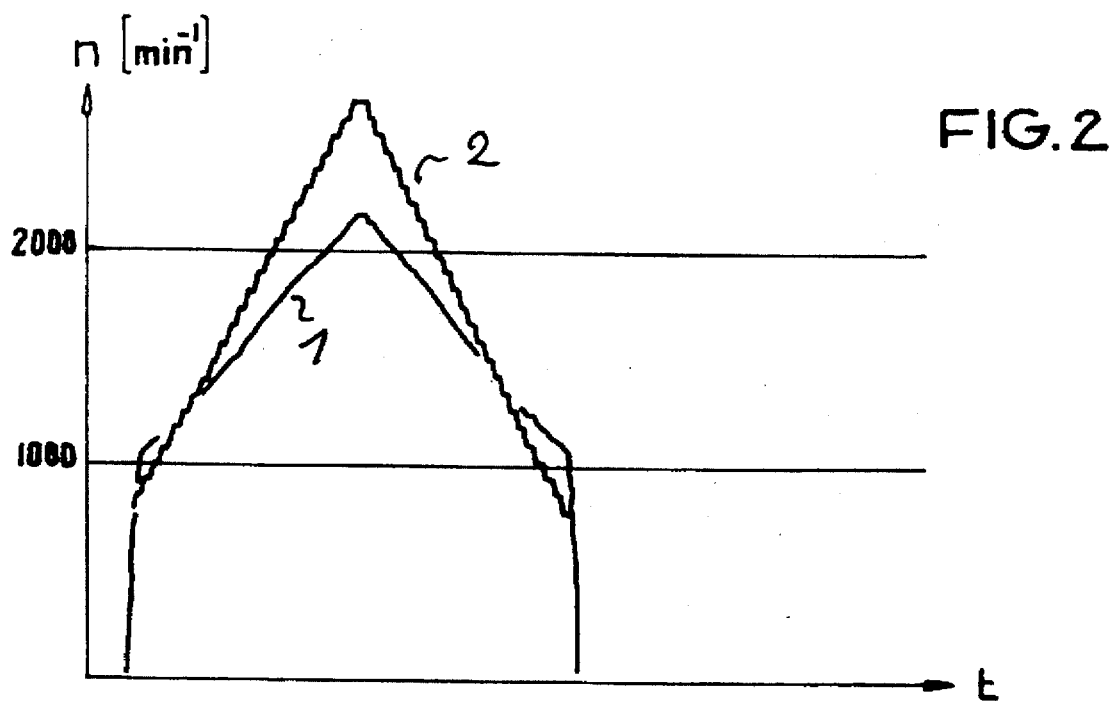
FIG. 2 shows a time/speed diagram produced by a capacitor motor controlled by the process according to the invention depicted in FIG. 1; and, FIGS. 3 and 4 are block diagrams each with a further circuit layout for implementing the method according to this invention, where an auxiliary winding without tap-offs is used.

The increase in output can thus take place continuously, in stages, by means of the coarse setting and the keying patterns generated by the 8-bit data words. In this way, an excellent degree of linearity is achieved, as can be seen from FIG. 2. Starting from the lowest speed, which corresponds to the lowest output stage, the motor is continuously accelerated to the maximum speed, corresponding to the highest output stage, in order then to be readjusted to the lowest speed. In FIG. 2, the characteristic graph 1 represents the actual speed progression, while characteristic graph 2 is the set value progression.

In the case of characteristic graph 2, the discretization stages produced by the keying patterns can clearly be identified, but these have been averaged out to allow for the inertia of the masses in the motor engaged in the rotary movement, so that consistent control behavior results, as shown by characteristic graph 1.

Figure 3:
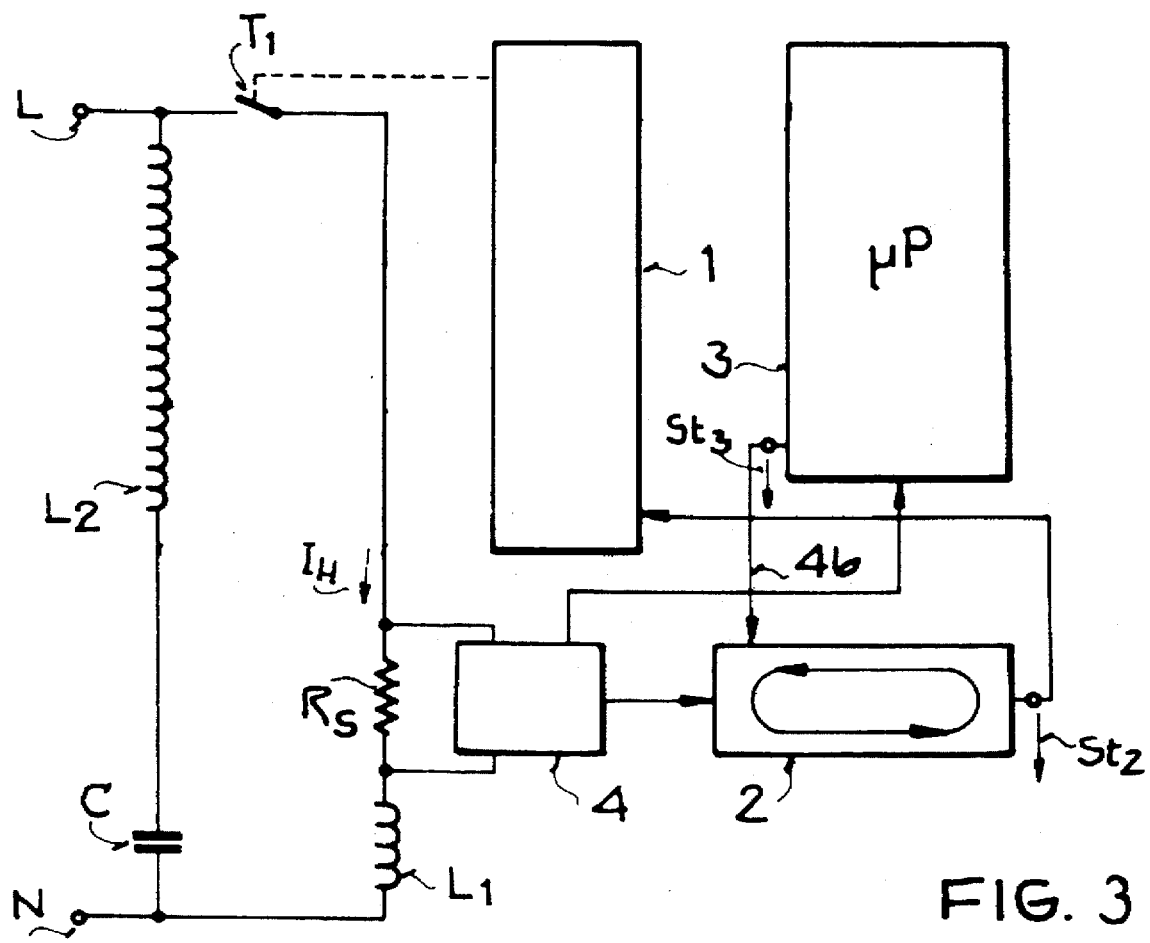
Figure 4:
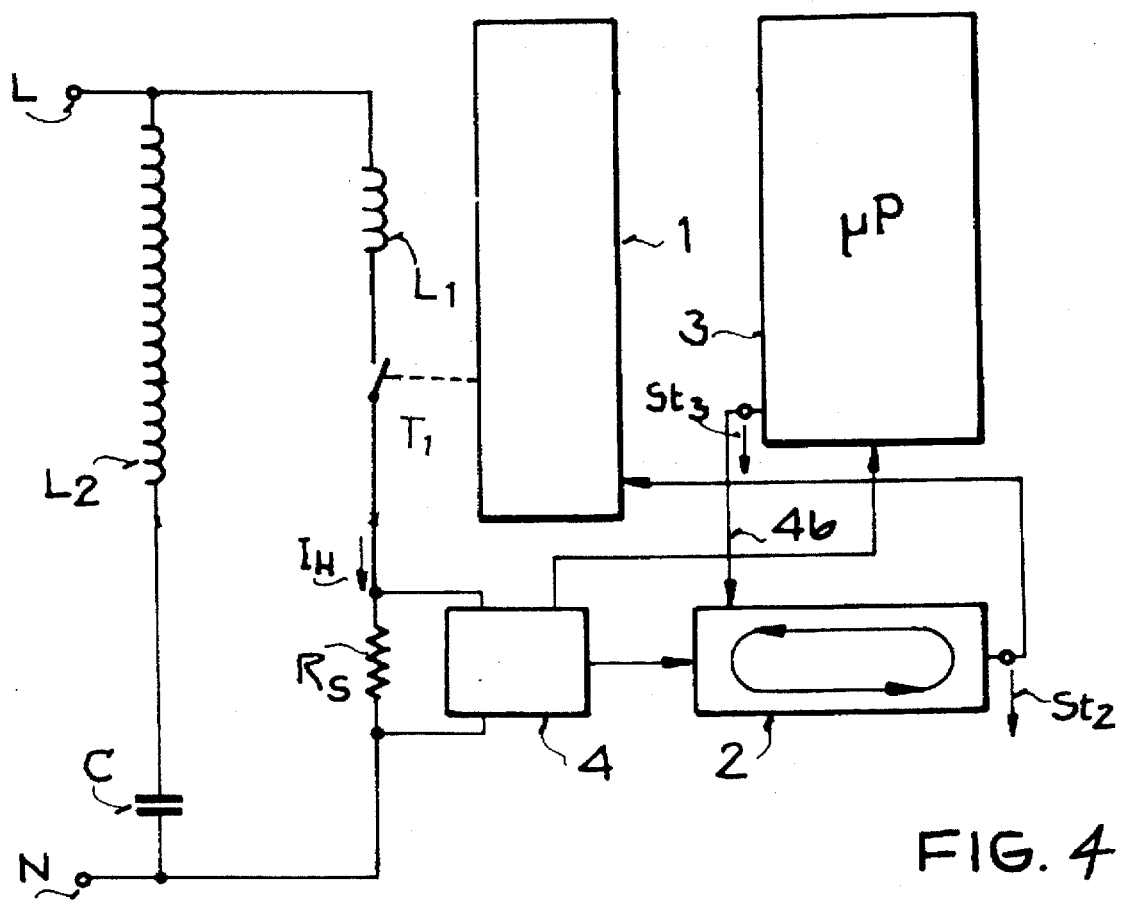

The embodiment examples provided by FIGS. 3 and 4 differ from the example shown in FIG. 1 in that the auxiliary winding L2 does not feature any tap-offs. According to FIG. 3, a switch T1 will connect main winding L1 via shunt resistor $R_s$ with phase L, whilst according to FIG. 4 a relevant switch T1 will connect main winding L 1 via shunt resistor Rs with neutral wire N of the operating voltage mains. In both these embodiment examples, too, an m-bit data word generated by microprocessor 3 will be fed to control unit 1—via a ring counter 2—for driving switch T1, as described in detail in connection with the embodiment example according to FIG. 1. As the auxiliary winding L2 does not feature any tap-offs, a first control signal St1—as required in connection with the embodiment example according to FIG. 1—will not be necessary either.

By appropriate selection of the m-bit data word, all power output levels between the lowest output stage—namely, when switch T1 is open—and the highest output stage—when switch T1 is closed—may be set.

Even a linear increase is possible until the highest power output level of the motor is reached, if the logical values (which cause switch T1 to close) of the respective m-bit data word successively increase until, in a maximum power output condition, all logical values of an m-bit data word cause switch T1 to close. This will then achieve a corresponding speed curve, as shown in FIG. 2.

On the basis of the linear behavior of the control process according to the invention, control circuits exhibiting constant control behavior can be constructed. Thus, as an example, the capacitor motor shown in FIGS. 1, 3 or 4 can be used as a pump motor for heating installations, whereby the control variable can relate to the speed of the motor, the differential pressure in the enclosed heating system or even the room temperature. The detection of actual values can be carried out in a manner known to a qualified engineer, e.g. with a tachogenerator or by the detection of electrical variables alone, whereby the microprocessor 3 deduces an adjustment factor from the actual value and a preset value, which adjustment factor will lead to a defined coarse adjustment of power output and a corresponding keying pattern in the case of the embodiment example according to FIG. 1, and which, in the case of the embodiment examples according to FIGS. 3 and 4, only requires an m-bit data word which will be convened by control unit 1 into an appropriate on/off keying pattern for switch T1.

The control process according to the invention can be used in any situation where capacitor motors are employed, including e.g. fan motors for cooling systems or drive motors for lifting equipment.

What is claimed is:

1. Device for controlling the power of a single-phase, mains-electricity powered induction capacitor motor, having a main winding and an auxiliary winding with n taps, said device including:

(n+2) switches connected to the auxiliary winding and its taps and controlled by a control circuit to adjust various output stages of the induction motor such that the auxiliary winding is connected in series with the main winding by a single switch in each case, or a single tap on the auxiliary winding is connected to the main winding in each case, or the main winding is connected directly to one phase of the single-phase mains power supply;

a microprocessor and ring memory, with the microprocessor setting a certain output stage for the coarse adjustment of the power to be output by the induction motor via the control circuit by the closing of a first of the switches, as well as generating a repeating m-bit data word for the fine adjustment of the power to be output by the induction motor and directing the m-bit data word to the ring memory, with the ring memory directing the logic values of the m-bit data word to the control circuit in succession for the fine adjustment of the power to be output by the induction motor, with said control circuit, as a function of the sequential logic values of the m-bit data word, activating the first switch selected for the coarse adjustment of the power output alternatively with a second switch, with the second switch adjusting the next higher or next lower output stage relative to the first switch, in synchronism with the frequency of the single-phase mains power supply, with the second switch adjusting the next higher or next lower output stage relative to the first switch.

2. Device in accordance with claim 1, wherein a zero crossing detector for the current in the main winding is provided to provide a clock pulse for the ring memory.

3. Device for controlling the power of a single-phase, mains-electricity powered induction capacitor motor having a main winding and an auxiliary winding, wherein via a switch controlled by a control circuit, the main winding is connected to single phase mains; and wherein a repeating digital m-bit data word is generated for setting the power to be output by the induction motor, the switch is operated depending on the sequence of the successive logical values of the m-bit data word, and operation of the switch is synchronized with the mains frequency; said device further comprising:

a microprocessor and a ring memory, with the microprocessor generating the m-bit data word and feeding it into the ring memory, and with the ring memory directing the logic values of the m-bit data word to the control circuit in succession for the fine adjustment of the power to be output by the induction motor.

4. Method for controlling the power of a single-phase, mains-electricity powered induction capacitor motor, with a main winding and an auxiliary winding with n taps, wherein various output stages of the induction motor are adjusted by use of (n+2) switches controlled by a control circuit, such that the auxiliary winding is connected in series with the main winding by a single switch in each case, or a single tap on the auxiliary winding is connected to the main winding in each case, or the main winding is connected directly to one phase of the single-phase mains power supply; and further comprising a) setting a certain output stage for the coarse adjustment of the power to be output by the induction motor by the closing of a first of the switches, b) generating a repeating digital m-bit data word for the fine adjustment of the power to be output by the induction motor, c) as a function of the sequential logic values of the m-bit data word, activating the first switch selected for the coarse adjustment of power output alternatively with a second switch, with the second switch adjusting the next higher or next lower output stage relative to the first switch, and d) synchronizing the alternate activation of the first and second switches with the frequency of the single-phase mains power supply.

5. Method in accordance with claim 4, further including energizing only the auxiliary winding to set the lowest output stage, and, in such case:

a) operating the switch which activates the entire auxiliary winding for the coarse adjustment of a low power to be output by the induction motor, and b) utilizing the m-bit data word generated for the fine adjustment of the power to be output to provide an on/off operation of the switch as a function of the sequential logic values of the m-bit data word.

* * * * *